(12) United States Patent
Sho et al.

(10) Patent No.: US 7,759,892 B2
(45) Date of Patent: Jul. 20, 2010

(54) VEHICLE MIRROR DEVICE

(75) Inventors: Yuji Sho, Isehara (JP); Takashi Ogawa, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 337 days.

(21) Appl. No.: 11/892,809

(22) Filed: Aug. 27, 2007

(65) Prior Publication Data
US 2008/0218888 A1    Sep. 11, 2008

(30) Foreign Application Priority Data
Sep. 4, 2006    (JP)    ............................. 2006-239035
Apr. 20, 2007   (JP)    ............................. 2007-111885

(51) Int. Cl.
G05D 3/00    (2006.01)
(52) U.S. Cl. .................................................. 318/467
(58) Field of Classification Search ................. 359/877; 318/467
See application file for complete search history.

(56) References Cited

U.S. PATENT DOCUMENTS 4,263,536 A * 4/1981 Lee et al. ..................... 318/266
4,514,670 A * 4/1985 Fassel et al. ................. 318/467
5,644,461 A * 7/1997 Miller et al. .................. 361/56
6,960,895 B2 * 11/2005 Makaran ..................... 318/245
7,008,067 B2 * 3/2006 Hsu ........................... 359/841

FOREIGN PATENT DOCUMENTS

| DE | 35 27 906 A1 | 2/1987 |
| GB | 2 293 152 A | 3/1996 |
| JP | 3-193012 A | 8/1991 |
| JP | 7-067385 A | 3/1995 |
| JP | 2005-306277 A | 11/2005 |

* cited by examiner

*Primary Examiner*—Alessandro Amari
(74) *Attorney, Agent, or Firm*—Foley & Lardner LLP (57) ABSTRACT

A vehicle mirror device includes a base unit configured to be fixed to a vehicle, a body unit that includes a mirror and is rotatably attached to the base unit, and a driving unit that drives the body unit to rotate with respect to the base unit. The driving unit includes a motor that drives the body unit to rotate, a current detecting circuit that detects current fluctuation due to rotation of the motor, and a switching circuit that switches ON or OFF current supply to the motor. While current fluctuation is detected, the switching circuit keeps current supply to the motor ON. While no current fluctuation is detected, the switching circuit switches OFF current supply to the motor.

3 Claims, 7 Drawing Sheets

VEHICLE MIRROR DEVICE

CROSS-REFERENCE TO RELATED APPLICATIONS

The present application claims priority to and incorporates by reference the entire contents of Japanese priority document, 2006-239035 filed in Japan on Sep. 4, 2006, and Japanese priority document, 2007-111885 filed in Japan on Apr. 20, 2007.

BACKGROUND OF THE INVENTION

1. Field of the Invention

The present invention relates to a vehicle mirror device.

2. Description of the Related Art

In conventional vehicle mirror devices used for, for example, power retractable side mirrors, when a mirror is retracted to a retracted position, a driving motor is locked. When supplied with current, the driving motor is driven to rotate even if it is being locked. As a result, the driving motor may be damaged. Therefore, there is a need of a technology for cutting off current supply to the driving motor immediately when the driving motor is locked.

For example, a conventional vehicle mirror device disclosed in Japanese Patent Application Laid-open No. 2005-306277 includes a motor-control circuit for controlling a motor for changing a position of a vehicle side mirror. The conventional motor-control circuit includes a ripple-current detecting unit, a determining unit, and a switching unit. The ripple-current detecting unit detects ripples in drive current supplied to the motor at regular intervals corresponding to the number of rotations of a rotor of the motor. The determining unit determines whether the rotor is rotating based on a result of the detection obtained by the ripple-current detecting unit. If the rotor is not rotating, the switching unit cuts off the drive current supplied to the motor.

SUMMARY OF THE INVENTION

It is an object of the present invention to at least partially solve the problems in the conventional technology.

According to an aspect of the present invention, a vehicle mirror device includes a base unit that is configured to be fixed to a vehicle, a body unit that includes a mirror and is rotatably attached to the base unit, and a driving unit that drives the body unit to rotate with respect to the base unit. The driving unit includes a motor that applies a driving force to the body unit to rotate the body unit, a current detecting circuit that detects current fluctuation that occurs due to rotation of the motor, and a switching circuit that switches ON or OFF current supply to the motor. While the current detecting circuit detects current fluctuation, the switching circuit keeps the current supply ON. When the current detecting circuit detects no current fluctuation, the switching circuit switches OFF the current supply.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. The present invention is not limited to the embodiments.

Figure 1:
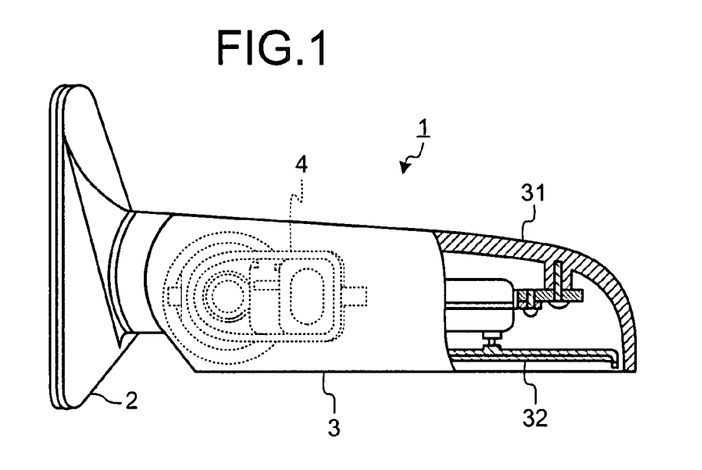
FIG. 1 is a schematic diagram of a vehicle mirror device according to an embodiment of the present invention.
Figure 2:
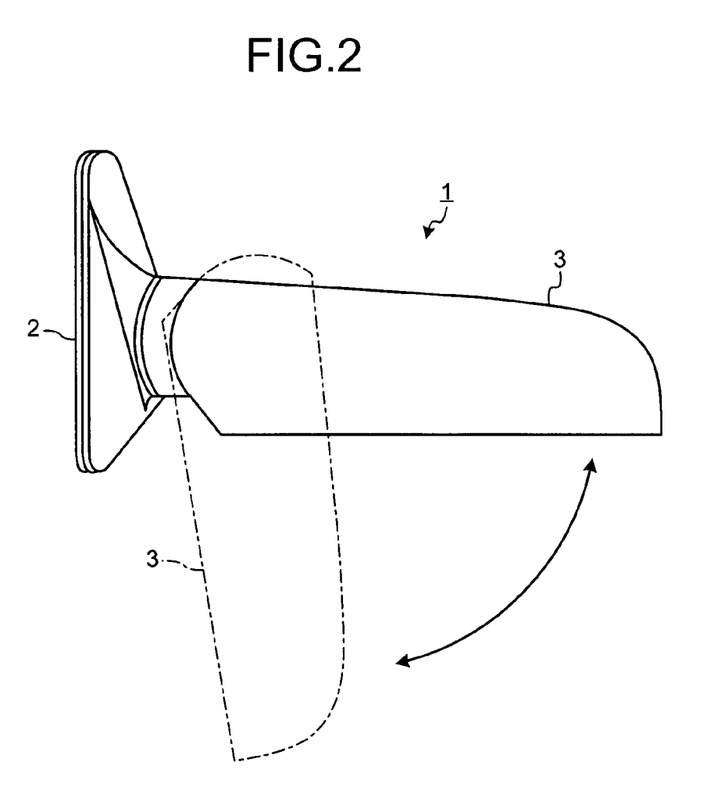
FIG. 2 is a schematic diagram for explaining movement of the vehicle mirror device shown in FIG. 1.

FIGS. 1 and 2 are schematic diagrams of a vehicle mirror device 1 according to an embodiment of the present invention. The vehicle mirror device 1 is explained as being applied to, but not limited to, a power retractable side mirror of a vehicle. The vehicle mirror device 1 includes a base unit 2, a body unit 3, and a driving unit 4. The base unit 2 is configured to be fixed to a vehicle door (not shown). The body unit 3 includes a mirror housing 31 and a mirror 32 that is fitted in the mirror housing 31, and is rotatably attached to the base unit 2 (see FIG. 2). The driving unit 4 drives the body unit 3 to rotate with respect to the base unit 2, and is housed in the mirror housing 31.

Figure 3:
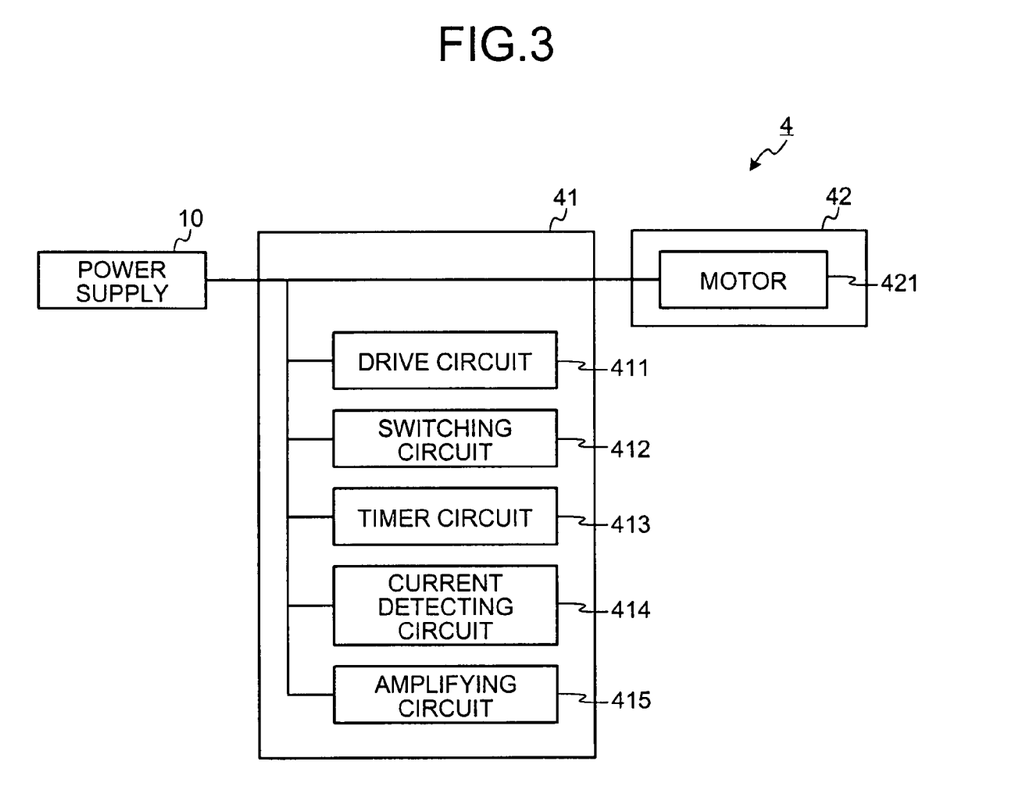
FIG. 3 is a block diagram of a driving unit shown in FIG. 1.

FIG. 3 is a block diagram of the driving unit 4. The driving unit 4 includes a control circuit 41 and a drive mechanism 42. The control circuit 41 controls the drive mechanism 42. The control circuit 41 is connected to a power supply (a direct-current power supply) 10 of the vehicle. The drive mechanism 42 includes a motor 421 and a plurality of gears (not shown) that is connected to the motor 421. The drive mechanism 42 causes the body unit 3 to rotate with respect to the base unit 2 by transmitting a rotation force of the motor 421 to the body unit 3 via the gears.

When the mirror 32 is in use, the body unit 3 is set in a set position at a predetermined angle with respect to the vehicle door so that a driver of the vehicle can have a clear view from the mirror 32. To retract the mirror 32, the driver performs a switch operation from inside the vehicle to drive the driving unit 4. Then, the driving unit 4 drives the body unit 3 to rotate to a predetermined retracted position. To use the mirror 32, the driver also performs a switch operation from inside the vehicle, and the driving unit 4 drives the body unit 3 to rotate to the set position.

The control circuit 41 includes a drive circuit 411, a switching circuit 412, a timer circuit 413, a current detecting circuit 414, and an amplifying circuit 415 (see FIG. 3). The drive circuit 411 is used for turning ON the switching circuit 412. The switching circuit 412 is used for switching ON/OFF current supply to the motor 421. Specifically, when the switching circuit 412 is turned ON, a current is supplied to the motor 421, and thereby causing the motor 421 to rotate. On the contrary, when the switching circuit 412 is turned OFF, the current supply to the motor 421 is cut off, so that the motor 421 stops rotating. The timer circuit 413 is used for defining a predetermined set time to turn OFF the switching circuit 412. The current detecting circuit 414 is used for detecting whether a current fluctuation (of a motor current) occurs due to the rotation of the motor 421. The amplifying circuit 415 is used for amplifying the current fluctuation detected by the current detecting circuit 414, and outputting the amplified current fluctuation to the timer circuit 413.

While the motor 421 rotates (except when the mirror 32 is set in the retracted position or the set position, i.e., the motor 421 is locked), a current fluctuation occurs due to the rotation of the motor 421. On the other hand, when the mirror 32 is set in the retracted position or the set position, i.e., when the motor 421 is locked, no current fluctuation occurs.

The current detecting circuit 414 is configured to detect the current fluctuation constantly. When the current fluctuation is detected by the current detecting circuit 414, the amplifying circuit 415 amplifies a detection signal of the current fluctuation, and outputs the amplified detection signal to the timer circuit 413 as an ON/OFF signal. The timer circuit 413 (for defining the set time to turn OFF the switching circuit 412) is configured to be reset periodically. A time interval to reset the timer circuit 413 is shorter than the set time, so that the switching circuit 412 can keep the current supply to the motor 421 ON. Therefore, the motor 421 keeps rotating.

When the motor 421 is locked, no current fluctuation is detected. Therefore, the timer circuit 413 is not reset. As a result, when the set time has elapsed, the switching circuit 412 switches OFF the current supply to the motor 421, and the current supply to the motor 421 is cut off, and then the motor 421 stops rotating. In this manner, when the motor 421 is locked, the current supply to the motor 421 can be cut off. Thus, it is possible to prevent an occurrence of damage to the motor 421 (for example, an occurrence of huge thermal stress on a coil of the motor 421).

As described above, in the vehicle mirror device 1, the current fluctuation due to the rotation of the motor 421 is detected to determine whether the motor 421 rotates or is locked. Based on a result of the determination, the switching circuit 412 switches ON/OFF the current supply to the motor 421. Therefore, when the motor 421 is locked, the current supply to the motor 421 can be cut off reliably, and thus the motor 421 can be protected from overcurrent.

For example, a conventional vehicle mirror device turns ON/OFF a switching circuit (current supply to a motor) by determining whether a motor rotates based on a current difference between currents obtained when the motor rotates and when the motor is locked. However, if the current difference is slight because of a performance of the motor, the conventional vehicle mirror device cannot properly determine whether the motor rotates. On the other hand, the vehicle mirror device 1 can properly determine whether the motor 421 rotates regardless of a current value of the motor 421.

According to the embodiment, the current supply to the motor 421 can be cut off when the motor 421 is locked. Thus, it is possible to reduce the unnecessary current supply to the motor 421 as compared with a case where current supply to a motor is defined by only a set time of a timer circuit simply.

Furthermore, while the current fluctuation is detected, the timer circuit 413 is reset periodically, and thus the current can be kept supplied to the motor 421. Therefore, even when a load on the motor 421 fluctuates suddenly, the vehicle mirror device 1 can properly determine whether the motor 421 rotates, as compared with the conventional vehicle mirror device in which whether the motor rotates is determined based on the current difference.

Figure 4:
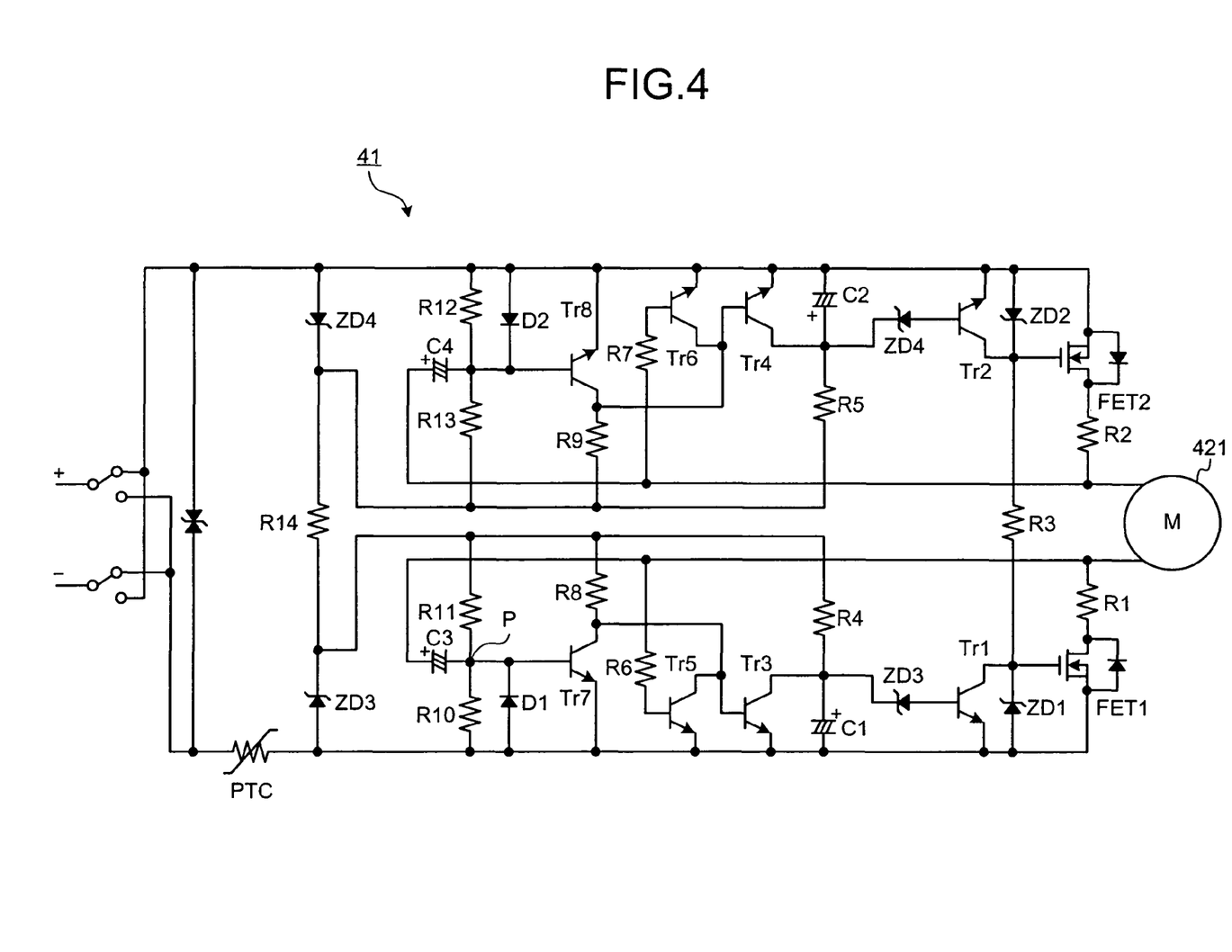
FIG. 4 is a circuit diagram of a control circuit shown in FIG. 3.

FIG. 4 is a circuit diagram of the control circuit 41. When the mirror 32 is to be retracted (or to be set up), an upper line of the control circuit 41 is connected to a positive pole of the power supply 10, and a lower line of the control circuit 41 is connected to a negative pole of the power supply 10 (see FIG. 4). On the contrary, when the mirror 32 is to be set up (or to be retracted), the upper line of the control circuit 41 is connected to the negative pole of the power supply 10, and the lower line of the control circuit 41 is connected to the positive pole of the power supply 10. A case where the upper line of the control circuit 41 is connected to the positive pole of the power supply 10 is explained below.

The drive circuit 411 includes a zener diode ZD1 and a resistance R3 (for the upper stage, a zener diode ZD2 and the resistance R3). When the mirror 32 is to be retracted (or to be set up), the switching circuit 412 is turned ON via the drive circuit 411. Then, the motor 421 is supplied with current, and is driven to rotate. At the same time, a switching element FET1 (for the upper stage, a switching element FET2) in the switching circuit 412 is turned ON by the action of the zener diode ZD1 (for the upper stage, the zener diode ZD2).

The switching circuit 412 includes the switching element FET1 (the switching element FET2). When the switching element FET1 is turned ON, the current is supplied to the motor 421, and then the motor 421 is driven to rotate. When the switching element FET1 is turned OFF, the current supply to the motor 421 is cut off, and then the motor 421 stops rotating. In this manner, the current supply to the motor 421 can be switched ON/OFF.

The timer circuit 413 includes a resistance R4, a capacitor Cl, a zener diode ZD3, and a transistor Tr1 (for the upper stage, a resistance R5, a capacitor C2, a zener diode ZD4, and a transistor Tr2). When the capacitor C1 is charged at a predetermined set voltage by the action of the zener diode ZD3, the transistor Tr1 is turned ON. Then, the switching element FET1 is turned OFF, and the current supply to the motor 421 is cut off, and then the motor 421 stops rotating. When the capacitor C1 is not charged at the set voltage because the timer circuit 413 is reset, the transistor Tr1 is kept OFF. Namely, the current is supplied to the motor 421, so that the motor 421 keeps rotating.

The current detecting circuit 414 includes a shunt resistance R1 and a capacitor C3 (for the upper stage, a shunt resistance R2 and a capacitor C4). The current detecting circuit 414 obtains a current fluctuation (see FIG. 5) that occurs due to the rotation of the motor 421 through the shunt resistance R1 and the capacitor C3, and outputs the obtained current fluctuation to the amplifying circuit 415.

The amplifying circuit 415 includes resistances R10 and R11, and a transistor Tr7 (for the upper stage, resistances R12 and R13, and a transistor Tr8). The amplifying circuit 415 amplifies the received current fluctuation of the motor 421. The amplifies current fluctuation is converted into an ON/OFF signal by a transistor Tr3 (for the upper stage, a transistor Tr4), and the ON/OFF signal is output to the timer circuit 413.

While the mirror 32 is retracted (or set up), when the control circuit 41 is connected to the power supply 10, a current is supplied to the motor 421 via the drive circuit 411, and then the motor 421 rotates. At this time, when the upper line of the control circuit 41 shown in FIG. 4 is connected to the positive pole of the power supply 10, the current passes through an internal diode of the switching element FET2, the shunt resistance R2, the motor 421, the shunt resistance R1, and the switching element FET1 in this order. Then, the current flows to the motor 421, whereby the motor 421 rotates. At this time, the current is flowing in the zener diode ZD1 via the resistance R3, and the switching element FET1 is ON.

Figure 5:
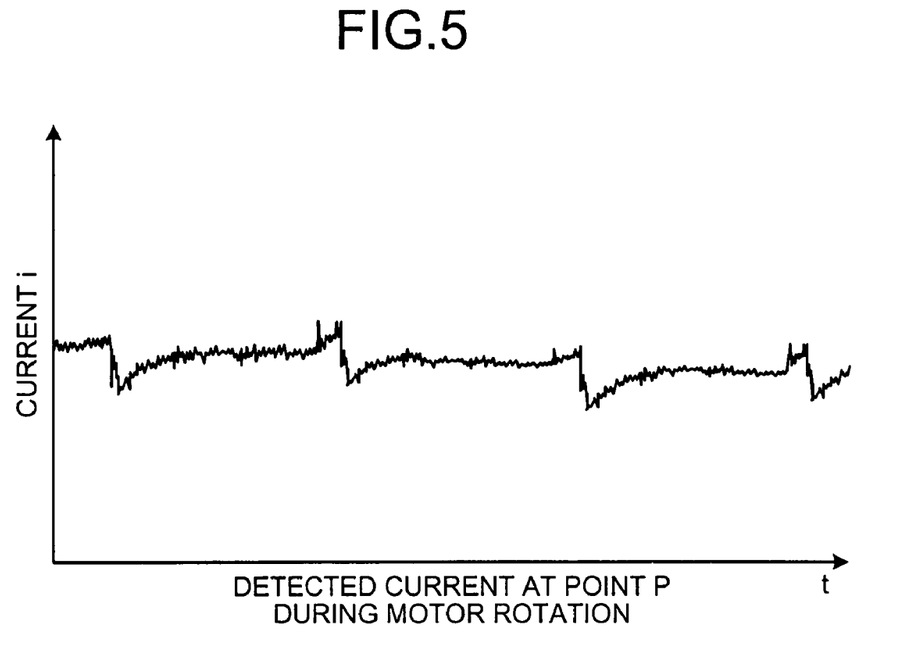
FIG. 5 is a graph of currents caused by the rotation of a motor shown in FIG. 3.

While the motor 421 rotates, a current fluctuation (such as a current fluctuation due to a change of a relative position between a stator magnet and a rotor coil, or a current fluctuation due to a change of a current phase) occurs in a waveform of a detected current (see FIG. 5). The current fluctuation is detected by the current detecting circuit 414, and then the detected current fluctuation is amplified by the amplifying circuit 415. Then, the amplified current fluctuation is converted into an ON/OFF signal by the transistor Tr3 (for the upper stage, the transistor Tr4), and the ON/OFF signal is input to the timer circuit 413. If the ON/OFF signal indicates an ON signal, the capacitor C1 (for the upper stage, the capacitor C2) is discharged, and then the timer circuit 413 is reset. The capacitor C1 is not charged at the set voltage because the timer circuit 413 is reset periodically, so that the transistor Tr1 is kept OFF. Namely, the switching element FET1 is kept ON, so that the motor 421 keeps rotating.

On the other hand, while the motor 421 is locked (i.e., the body unit 3 is set in the set position or the retracted position), no current fluctuation occurs because the motor 421 does not rotate. Therefore, the waveform of the detected current indicates a constant current, so that the ON/OFF signal indicating an OFF signal only is input to the timer circuit 413 via the transistor Tr3 (for the upper stage, the transistor Tr4). Therefore, the capacitor C1 (for the upper stage, the capacitor C2) is charged at the set voltage by the zener diode ZD3, and then the transistor Tr1 is turned ON. Consequently, the switching element FET1 is turned OFF, and the current supply to the motor 421 is cut off, and then the motor 421 stops rotating.

When the switching element FET1 is turned OFF, a potential of the shunt resistance R1 (for the upper stage, the shunt resistance R2) is surged, so that the transistor Tr5 (for the upper stage, the transistor Tr6) is turned ON, and the transistor Tr3 (for the upper stage, the transistor Tr4) is latched in the OFF state.

In the vehicle mirror device 1, the control circuit 41 (the current detecting circuit 414) detects a current fluctuation that occurs due to the rotation of the motor 421. When no current fluctuation is detected, it is determined that the motor 421 is locked, and the switching circuit 412 switches OFF the current supply to the motor 421. Consequently, the current supply to the motor 421 is cut off, and thus the motor 421 can be protected from overcurrent.

However, the current fluctuation occurs as long as the motor 421 rotates even if a rotating speed of the motor 421 is low. Therefore, in case the motor 421 falls into an overcurrent state due to a sudden overload on the motor 421, the switching circuit 412 may keep switching ON the current supply to the motor 421, and thus the motor 421 may keep rotating. Also, in case the switching circuit 412 has any damage, the motor 421 may keep rotating.

To protect the motor 421 from the overcurrent, a positive temperature coefficient (PTC) thermistor is provided in the control circuit 41 (see FIG. 4). The PTC thermistor is connected in series with the control circuit 41. Upon occurrence of the overcurrent, the PTC thermistor amplifies its resistance, and thereby developing a heat. As a result, a load on the motor 421 due to the overcurrent is reduced, and thus the motor 421 can be protected from the overcurrent.

However, in transition to the PTC thermistor, an applied voltage to the control circuit 41 may be degraded, and thereby causing the control circuit 41 to fall into an unstable condition.

Figure 6:
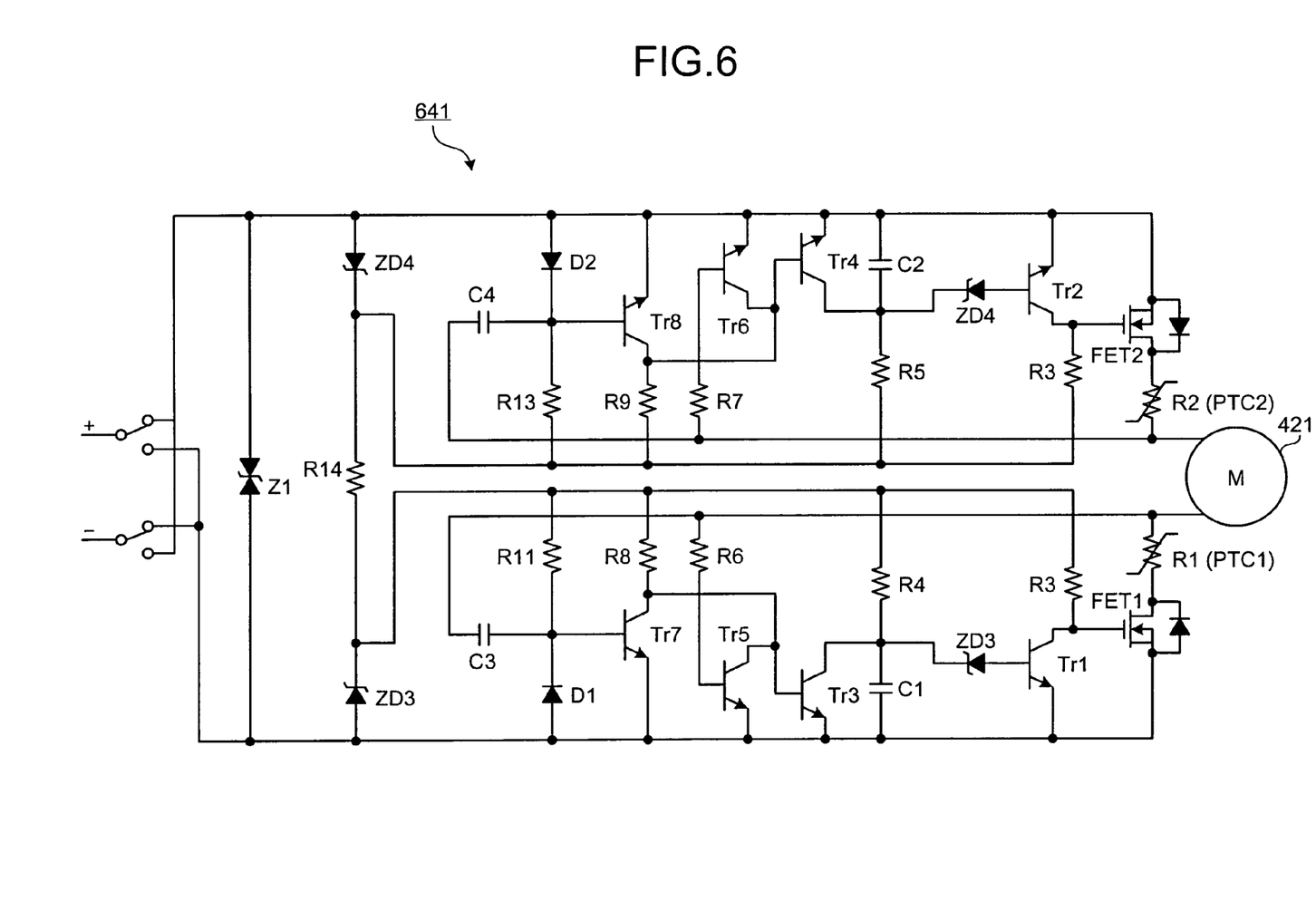
FIG. 6 is a circuit diagram of a control circuit according to a first modification of the embodiment.

Therefore, in a case where the control circuit 41 (the current detecting circuit 414) includes the shunt resistance R1 (the shunt resistance R2) for detecting the current fluctuation of the motor 421, the shunt resistance R1 (the shunt resistance R2) preferably includes a PTC thermistor PTC1 (for the upper stage, a PTC thermistor PTC2) as shown in FIG. 6. FIG. 6 is a circuit diagram of a control circuit 641 according to a first modification of the embodiment. The portions identical to those in FIG. 4 for the control circuit 41 are denoted with the same reference numerals, and the description of those portions is omitted. In the control circuit 41, the PTC thermistor is connected in series with the control circuit 41 (see FIG. 4). In the control circuit 641, the shunt resistance R1 (for the upper stage, the shunt resistance R2) includes the PTC thermistor PTC1 (for the upper stage, the PTC thermistor PTC2) instead of providing the PTC thermistor.

While the motor 421 is driven to rotate, the current fluctuation, which occurs due to the rotation of the motor 421, is detected via the shunt resistance R1 (for the upper stage, the shunt resistance R2). While the current fluctuation is detected, the switching circuit 412 (the switching element FET1) keeps switching ON the current supply to the motor 421, and thus the motor 421 keeps rotating. When no current fluctuation is detected, the switching circuit 412 switches OFF the current supply to the motor 421, and the current supply to the motor 421 is cut off, and then the motor 421 stops rotating. Thus, the motor 421 can be protected from the overcurrent.

If the rotating speed of the motor 421 decreases, for example, due to an increase of a load on the motor 421, a current value of the motor 421 increases. In this case, the shunt resistance R1 (for the upper stage, the shunt resistance R2) includes the PTC thermistor PTC1 (for the upper stage, the PTC thermistor PTC2), so that the shunt resistance R1 (for the upper stage, the shunt resistance R2) causes a development of heat, and thereby increasing its resistance value. As a result, an applied voltage to the motor 421 is degraded, and then the motor 421 stops rotating. Therefore, no current fluctuation occurs because the motor 421 stops rotating, and the switching circuit 412 switches OFF the current supply to the motor 421, i.e., the current supply to the motor 421 is cut off. Thus, the motor 421 can be protected from the overcurrent.

In the control circuit 641 in which the shunt resistance R1 (for the upper stage, the shunt resistance R2) includes the PTC thermistor PTC1 (for the upper stage, the PTC thermistor PTC2), even if the applied voltage to the motor 421 is degraded, the applied voltage to the control circuit 641 hardly fluctuates by the action of the PTC thermistor PTC1 (for the upper stage, the PTC thermistor PTC2) (the shunt resistance R1 (for the upper stage, the shunt resistance R2)) as compared with the control circuit 41 in which the shunt resistance R1 (for the upper stage, the shunt resistance R2) and the PTC thermistor are separately arranged (see FIG. 4). Thus, the control circuit 641 can operate stably.

The control circuit 641 includes the first current detecting circuit 414 to be used when the mirror 32 is retracted and the second current detecting circuit 414 to be used when the mirror 32 is set up. The first and second current detecting circuits 414 are arranged symmetrically, and connected to the motor 421. The shunt resistances R1 and R2 of the first and second current detecting circuits 414 respectively include the PTC thermistors PTC1 and PTC2.

In the control circuit 641, when the current is supplied to the motor 421, the current flows in both of the PTC thermistors PTC1 and PTC2 (the shunt resistances R1 and R2). Therefore, in case a current value of the motor 421 increases due to a decrease of the rotating speed of the motor 421, any one of the PTC thermistors PTC1 and PTC2 that causes a development of heat earlier is activated. Moreover, the PTC thermistors PTC1 and PTC2 (the shunt resistances R1 and R2) are respectively arranged in each of the symmetrically-arranged current detecting circuits 414, so that a design of the control circuit 641 can be simplified.

Figure 7:
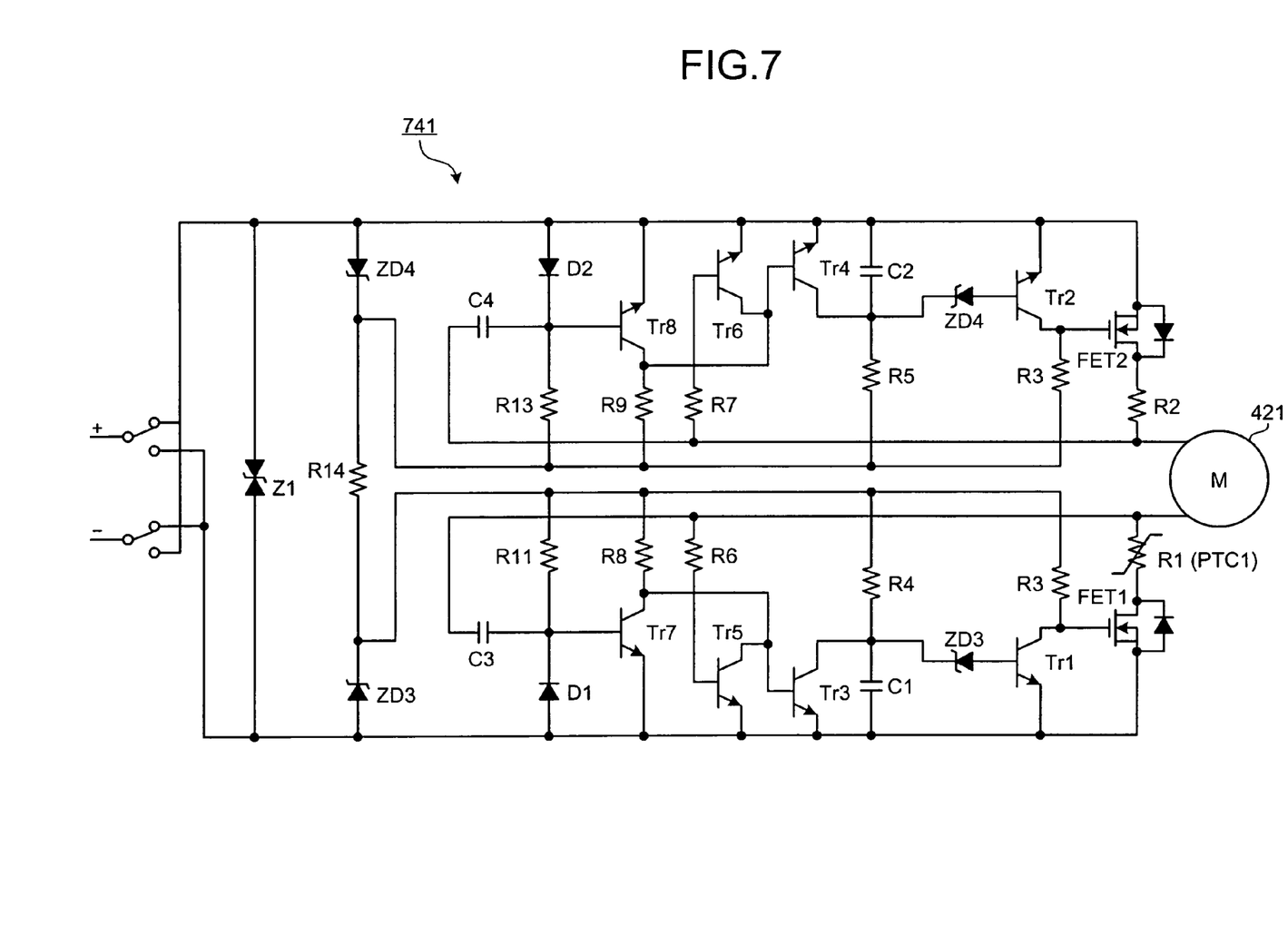
FIG. 7 is a circuit diagram of a control circuit according to a second modification of the embodiment.

Alternatively, either one of the shunt resistances R1 and R2 can include the PTC thermistor PTC1 or PTC2 as shown in FIG. 7. FIG. 7 is a circuit diagram of a control circuit 741 according to a second modification of the embodiment. In the control circuit 741, only the shunt resistance R1 includes the PTC thermistor PTC1. Even though the shunt resistance R2 does not include the PTC thermistor PTC2, the control circuit 741 can operate stably.

As described above, the control circuit 641 includes the first and second current detecting circuits 414. The first and second current detecting circuits 414 include the shunt resistances R1 and R2, respectively, for detecting the current fluctuation of the motor 421.

However, with the configuration of the control circuit 641, when the vehicle mirror device 1 is in use, the current flows in both of the shunt resistances R1 and R2, so that a voltage drop occurs in both of the shunt resistances R1 and R2. Therefore, a voltage to be supplied to the motor 421 is wasted.

Figure 8:
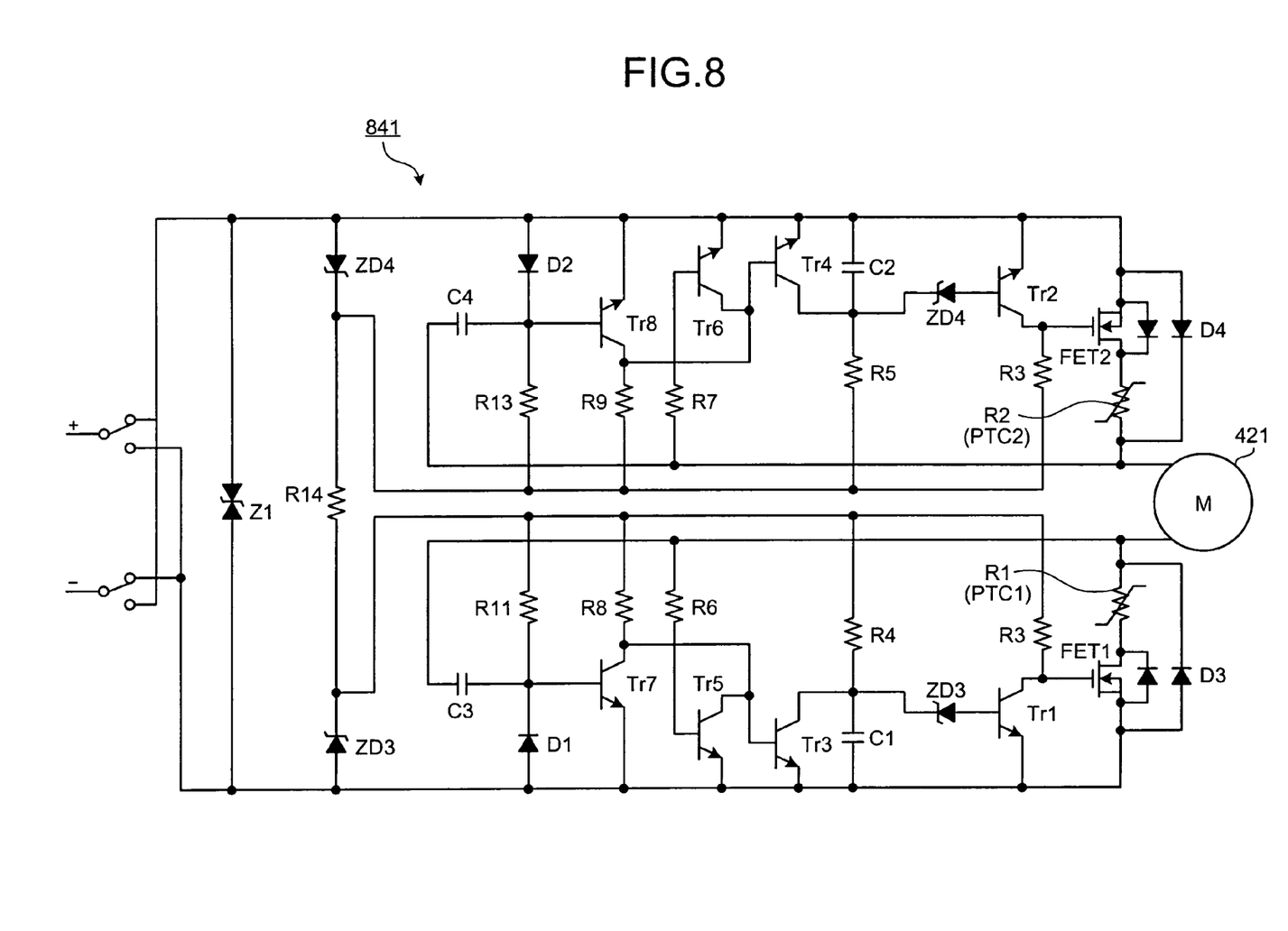
FIG. 8 is a circuit diagram of a control circuit according to a third modification of the embodiment.

To solve the problem, a diode is connected in parallel to the shunt resistance as shown in FIG. 8. FIG. 8 is a circuit diagram of a control circuit 841 according to a third modification of the embodiment. In the control circuit 841, a diode D3 is connected in parallel to the shunt resistance R1 of the first current detecting circuit 414, and a diode D4 is connected in parallel to the shunt resistance R2 of the second current detecting circuit 414. The diodes D3 and D4 are arranged in such a manner that the current to flow into the shunt resistance R2 is cut off while the current is flowing into the shunt resistance R1, and vice versa.

For example, in the first current detecting circuit 414, which is used when the mirror 32 is retracted, the shunt resistance R1 is connected in series with the switching element FET1 of the switching circuit 412. The diode D3 is connected in parallel to the shunt resistance R1 and the switching element FET1. In the same manner as the first current detecting circuit 414, in the second current detecting circuit 414, which is used when the mirror 32 is set up, the shunt resistance R2 is connected in series with the switching element FET2 of the switching circuit 412. The diode D4 is connected in parallel to the shunt resistance R2 and the switching element FET2.

The diodes D3 and D4 are arranged in such a manner that when the current is supplied to the shunt resistance R1 (or the shunt resistance R2) and the switching element FET1 (or the switching element FET2), the current supply to the shunt resistance R2 (or the shunt resistance R1) and the switching element FET2 (or the switching element FET1) is cut off. Therefore, when the mirror 32 is retracted or set up, the current does not flow in both of the shunt resistances R1 and R2.

In this manner, when the mirror 32 is retracted (or the mirror 32 is set up), the current flows in only the shunt resistance R1 (or the shunt resistance R2). Therefore, an occurrence of the voltage drop due to the shunt resistances R1 and R2 can be reduced as compared with the case of the control circuit 641 in which the current flows in both of the shunt resistances R1 and R2. Thus, in the control circuit 841, a voltage can be supplied to the motor 421 efficiently.

As in the other modifications, it is preferable that the shunt resistances R1 and R2 of the first and second current detecting circuits 414 include the PTC thermistor PTC1 and the PTC thermistor PTC2, respectively, as shown in FIG. 8. By the action of the PTC thermistors PTC1 and PTC2, the control circuit 841 can operate stably.

According to an aspect of the present invention, when a motor is locked, current supply to the motor can be appropriately cut off, and thus the motor can be protected from overcurrent. Even when a load on the motor fluctuates suddenly, whether the motor rotates can be properly determined.

Moreover, even if a voltage applied to the motor decreases, a voltage applied to a control circuit hardly fluctuates by the action of a PTC thermistor. Thus, the control circuit can operate stably.

Furthermore, when a mirror is retracted (or when the mirror is set up), current flows in either one of shunt resistances. Therefore, an occurrence of a voltage drop due to the shunt resistances can be reduced. Thus, a voltage can be supplied to the motor efficiently.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle mirror device comprising:
   a base unit that is configured to be fixed to a vehicle;
   a body unit that includes a mirror, and is rotatably attached to the base unit; and
   a driving unit that drives the body unit to rotate with respect to the base unit, wherein the driving unit includes
   a motor that applies a driving force to the body unit to rotate the body unit;
   a current detecting circuit that detects current fluctuation that occurs due to rotation of the motor; and
   a switching circuit that switches ON or OFF current supply to the motor,
   while the current detecting circuit detects current fluctuation, the switching circuit keeps the current supply ON, and
   when the current detecting circuit detects no current fluctuation, the switching circuit switches OFF the current supply,
   the current detecting circuit includes a first current detecting circuit used when the mirror is retracted, and a second current detecting circuit used when the mirror is set up,
   the first current detecting circuit includes a first shunt resistance for detecting current fluctuation, and the second current detecting circuit includes a second shunt resistance for detecting current fluctuation,
   the driving unit further includes a first diode connected in parallel to the first shunt resistance, and a second diode connected in parallel to the second shunt resistance, and
   when a current flows in either one of the first shunt resistance and the second shunt resistance, current supply to the other one of the first shunt resistance and the second shunt resistance is cut off by the corresponding one of the first diode and the second diode.

2. The vehicle mirror device according to claim 1, wherein the driving unit further includes a timer circuit that defines a time to turn OFF the switching circuit, and
   while the current detecting circuit detects current fluctuation, the timer circuit is reset.

3. The vehicle mirror device according to claim 1, wherein the current detecting circuit includes a shunt resistance for detecting current fluctuation, and
   the shunt resistance includes a positive temperature coefficient thermistor.

* * * * *